UNITED STATES PATENT OFFICE 2,787,272
Patented Apr. 2, 1957

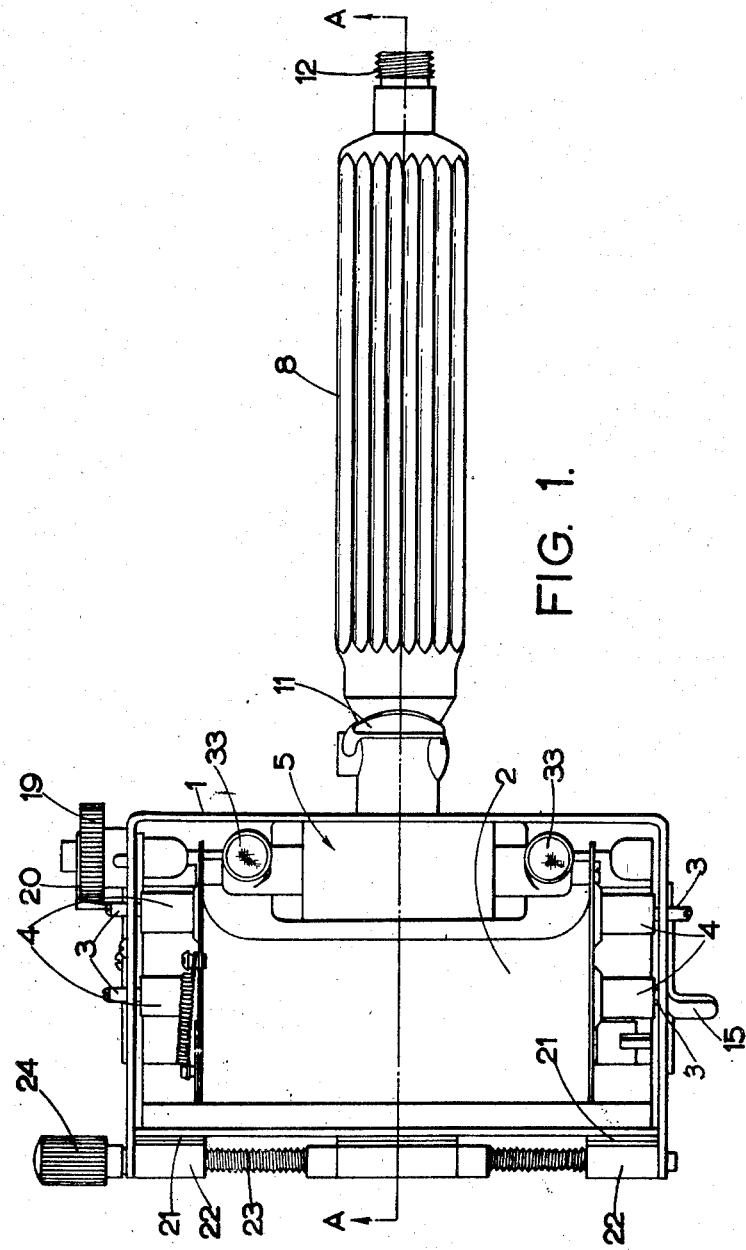

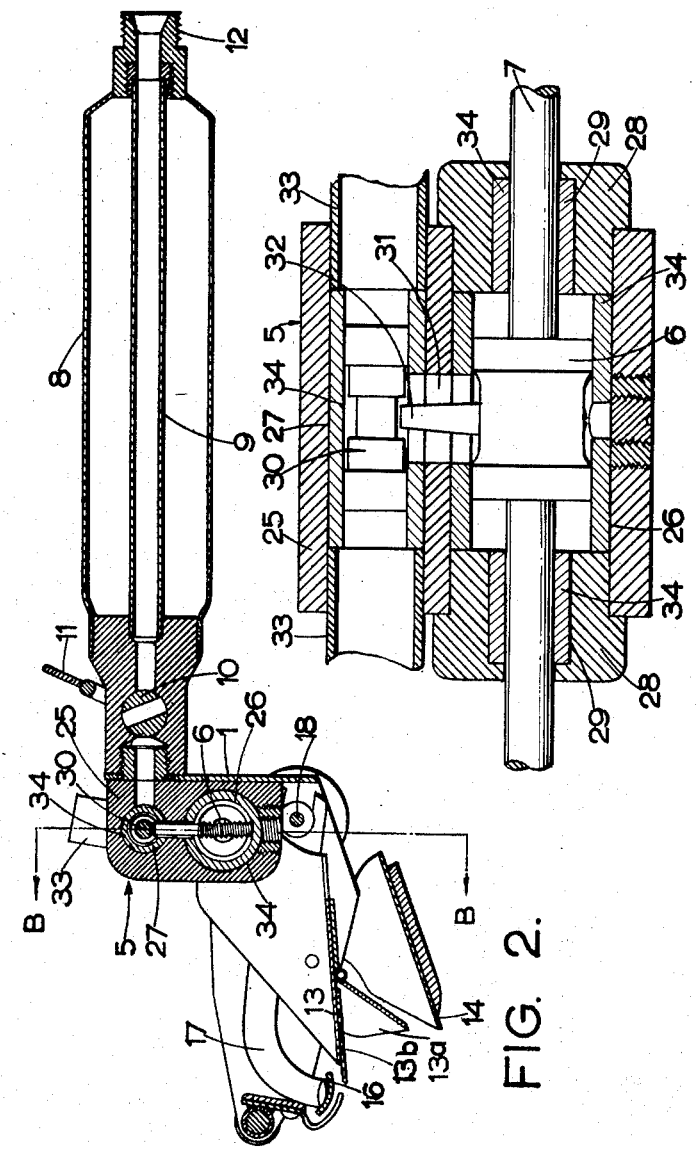

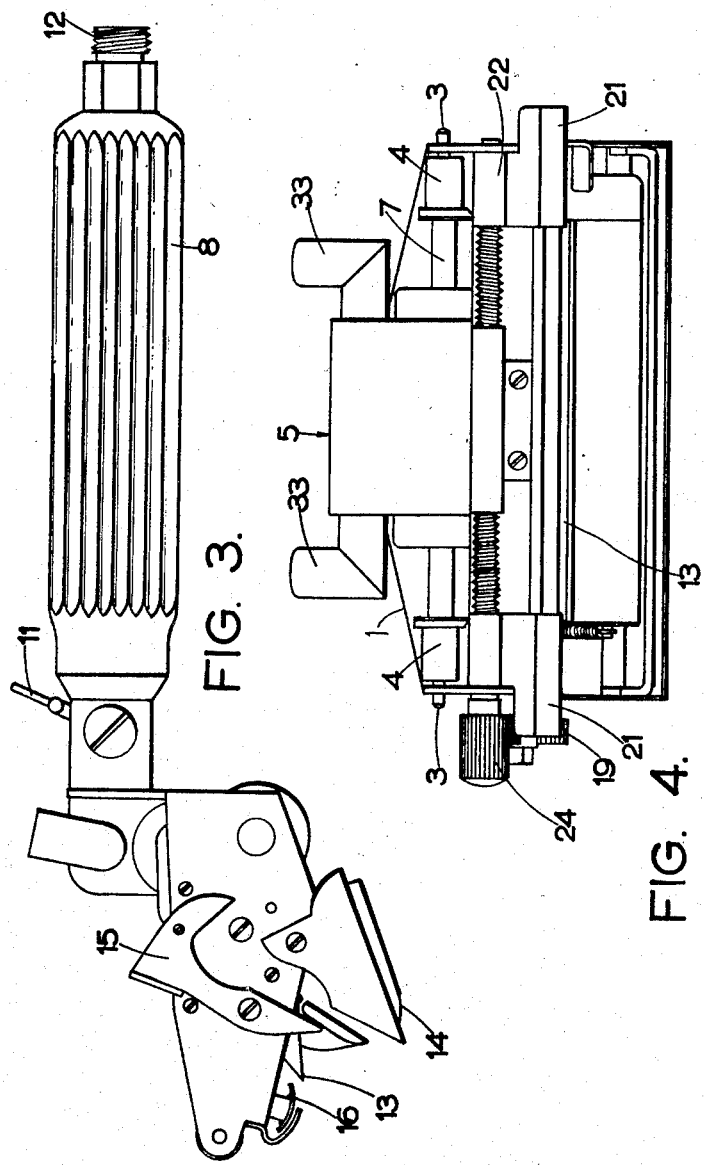

2,787,272

DERMATOMES

Walter Groom, Kingsbury, London, England, assignor to Allen & Hanburys Limited, London, England, a British company Application January 25, 1954, Serial No. 405,768

Claims priority, application Great Britain February 2, 1953

1 Claims. (Cl. 128—305)

This invention relates to dermatomes.

According to the present invention a dermatome comprises a knife holder mounted so that it can reciprocate lengthwise of the cutting edge of a knife carried by it and a motor operable pneumatically to reciprocate the knife holder. The knife holder can be reciprocated by positive air or gas pressure, i. e. by air or gas at a pressure higher than atmospheric pressure or by negative pressure, i. e. by suction. Sources of suction and bottles of compressed air are readily available in most hospitals.

The knife holder is preferably reciprocated by means of an air pressure motor comprising a block having two parallel bores; an operating piston in one of the bores, the piston having, extending from each end, a piston rod connected with the knife holder; a slide valve in the second bore for controlling the application of air under pressure to opposite sides of the piston; and a pin connected with the operating piston and extending through a slot between the two bores for displacing the slide valve at the end of each working stroke of the piston to reverse the application of pressure to the piston.

In the accompanying drawings which illustrate a preferred embodiment of the invention:

Figure 1 is a plan view of a dermatome,
Figure 2 is a section on the line A—A of Figure 1,
Figure 3 is a side elevation,
Figure 4 is a front elevation, and
Figure 5 is a section, to an enlarged scale, on the line B—B of Figure 2 showing a motor forming part of the dermatome.

The dermatome illustrated comprises a substantially rectangular frame 1 in which a knife holder 22 is reciprocably mounted, the holder being conveniently supported on fixed pins 3 which extend outwards from two opposite sides of the knife holder 2 and enter corresponding openings in the frame 1. Rubber (resilient) buffers 4 in the form of rubber rings mounted on the slide pins 3 are provided between the knife holder 2 and the frame 1. A pneumatic motor 5 is fixed inside the third side (or back) of the frame 1 and has a piston 6 provided with a piston or actuating rod 7 extending out of opposite ends of the motor housing and connected at each end to the knife holder 2 so that the knife holder is reciprocated when air pressure is applied to the motor 5. A handle 8 extends outwards from the back of the frame 1 and has a manifold 9 inside it which manifold communicates with the motor 5 and can be opened or closed as desired by an "on-off" tap or valve 10 controlled by a lever 11. The rear end of the handle 8 has a nipple 12 which leads to the interior of the manifold 9 and is adapted to receive a flexible hose (not shown) connected with a source of air pressure such as a compressed air bottle.

The knife holder 2 comprises a base plate 13 and a spring loaded, hinged, clamping plate 13a (illustrated in the open position) between which a removable knife blade 13b can be clamped in such a position that it is reciprocable, with the knife holder 2, lengthwise of its cutting edge. A cutting angle for the dermatome, in relation to the cutting edge, may be obtained by means of a cover plate 14. This plate 14 covers the reciprocating knife blade and holder 2, leaving about 1/16th of an inch of the knife blade exposed, and lifts and closes in conjunction with the clamping plate 13a, operated by a snap clip 15.

A "depth of cut" control member such as a shoe 16 or a roller extends across the front of the frame 1 adjacent the cutting edge of the knife blade. The thickness of the skin graft cut by the knife is determined by the spacing between this shoe 16 and the cutting edge of the blade which spacing can be adjusted by displacement of the shoe with respect to the knife; for this purpose, the shoe 16 is carried by two arms 17 pivotally mounted one inside each side member of the frame, these arms being movable by cams (not visible in the drawings) carried by a rod 18 extending across the frame near the back thereof and rotatable by means of a knurled wheel 19 outside the frame. A pointer 20 movable with the knurled wheel 19 over a scale (not visible) calibrated to give an indication of the spacing between the shoe 16 and the blade edge can be provided if desired. The width of the graft cut by the knife is determined by means of two mask plates 21 which are slidable over the front of the frame to cover desired portions of the cutting edge of the blade so as to reduce its effective length. These plates 21 have internally screw-threaded sleeves 22 which receive oppositely threaded portions of a rod 25 extending across the front of the frame. This rod 23 has a knurled portion 24 at one end so that it can be rotated to move the mask plates 21 towards or away from each other to vary the exposed length of the cutting edge.

The compressed air motor 5 preferably comprises a block 25 provided with two parallel bores 26, 27 one of which (26) has a greater diameter than the other (27). The larger bore 26 is closed at each end by plugs 28 having bores 29 and contains the operating piston 6 of the motor. The piston or actuating rod 7 extends from opposite sides of the piston 6 and is carried through the bores 29 to the knife holder 2. The smaller bore 27 communicates with the manifold 9 and contains a slide valve 30 which controls the application of air pressure to the piston 6. This valve 30 has two working positions in each of which it opens a passage from one side of the valve to one side of the piston 6. The motor block 25 has a control slot 31 between the piston bore 26 and the valve bore 27. A pin 32 extends through this slot 31, laterally of the piston, and is received in a co-operating recess in the valve. When the piston 6 has completed one operating stroke, the movement of the pin will move the valve from one working position to the other to reverse the application of pressure to the piston which therefore moves in the opposite direction. The opposite sides of the bore 27 are connected with air vent passages 33. The various bores of the motor are lined with oil-less bearings 34, preferably of graphite so that the dermatome can be sterilized by boiling in water or by autoclaving; the device could not be sterilized in this way if the bearings used oil.

It will be appreciated that the motor 5 can be arranged to be operated by suction if the slide valve 30 controls two passages each of which leads from one side of the valve to the opposite side of the piston.

What I claim is:

A dermatome comprising a frame having openings in two opposite sides; a knife holder; fixed pins extending outwards from two opposite sides of said knife holder into said openings so that said knife holder can reciprocate in said frame; resilient buffers on said fixed pins between said knife holder and said sides of said frame; and an air pressure motor mounted on said frame for effecting reciprocation of said knife holder.

References Cited in the file of this patent
UNITED STATES PATENTS

| | | |
|---|---|---|
| 1,736,246 | Blair | Nov. 19, 1929 |
| 2,053,301 | Russell | Sept. 8, 1936 |
| 2,590,299 | Douglas | Mar. 25, 1952 |
| 2,691,377 | Hood | Oct. 12, 1954 |